United States Patent
Petroj

(10) Patent No.: US 12,185,705 B2
(45) Date of Patent: Jan. 7, 2025

(54) CAST CONTROL AND DRAG MECHANISM

(71) Applicant: Florin Petroj, Macomb, MI (US)

(72) Inventor: Florin Petroj, Macomb, MI (US)

( * ) Notice: Subject to any disclaimer, the term of this patent is extended or adjusted under 35 U.S.C. 154(b) by 310 days.

(21) Appl. No.: 16/824,562

(22) Filed: Mar. 19, 2020

(65) Prior Publication Data

US 2020/0214277 A1 Jul. 9, 2020

Related U.S. Application Data

(63) Continuation-in-part of application No. PCT/US2018/054305, filed on Oct. 4, 2018.

(60) Provisional application No. 62/568,546, filed on Oct. 5, 2017.

(51) Int. Cl.
*A01K 87/00* (2006.01)
*F16B 2/06* (2006.01)

(52) U.S. Cl.
CPC .......... *A01K 87/005* (2013.01); *A01K 87/002* (2013.01); *F16B 2/065* (2013.01)

(58) Field of Classification Search
CPC .. A01K 87/002; A01K 87/005; A01K 87/007; A01K 87/008; A01K 91/06; A01K 97/00
USPC ................................ 43/4, 18.1 HR, 19.2, 25
See application file for complete search history.

(56) References Cited

U.S. PATENT DOCUMENTS

| | | | | |
|---|---|---|---|---|
| 3,643,367 A * | 2/1972 | Denny | ................... | A01K 91/02 43/25 |
| 4,541,197 A * | 9/1985 | LeRoue | ............... | A01K 87/025 43/18.1 R |
| 5,040,323 A * | 8/1991 | Hughes, Jr. | ............ | A01K 81/04 43/17 |
| 5,170,581 A * | 12/1992 | Lyons | .................... | A01K 91/08 43/43.12 |
| 5,381,619 A * | 1/1995 | Watkins | ............... | A01K 87/005 43/18.1 HR |
| 5,575,103 A * | 11/1996 | Hare | ..................... | A01K 87/002 43/18.1 HR |
| 7,461,476 B1 * | 12/2008 | Davis | .................... | A01K 87/002 43/18.1 R |
| 2008/0193260 A1 * | 8/2008 | Yokokohji | ............... | G05G 9/04 901/4 |
| 2009/0209171 A1 * | 8/2009 | Kriman | .................. | A63H 33/26 446/484 |
| 2011/0209383 A1 * | 9/2011 | Tennyson | ............. | A01K 89/017 242/250 |
| 2015/0223438 A1 * | 8/2015 | Tschantz | ............... | A01K 87/007 43/44.88 |

* cited by examiner

*Primary Examiner* — David J Parsley
(74) *Attorney, Agent, or Firm* — Kohn & Associates PLLC; Kenneth I. Kohn; Laura S. Dellal

(57) ABSTRACT

A fishing rod including a rod body, a free line cast control and drag mechanism operatively connected to a proximal end of the rod body, and a line operatively threaded through the free line cast control and drag mechanism and running through a hollow passageway of the rod body and out a distal end. A method of fishing with the fishing rod by casting the line out of the distal end of the rod body onto a body of water, detecting that a fish is on the line, and pulling the line through the proximal end of the rod body and through the free line cast control and drag mechanism.

13 Claims, 6 Drawing Sheets

CAST CONTROL AND DRAG MECHANISM

BACKGROUND OF THE INVENTION

1. Technical Field

The present invention relates to fishing equipment and especially fly fishing rods. More specifically, the present invention relates to methods of casting short distances with a fishing rod.

2. Background Art

Fly fishing is a popular sport wherein a fisherman uses an artificial fly to catch fish by casting the fly with a fly rod and fly line. The weight of the fly line carries the hook through the air, as opposed to a lure with other fishing methods.

Currently, during fly fishing, in order to cast a fly, a reel, rod, and fly line are required. For example, U.S. Pat. No. 5,237,770 to Creek discloses a fly rod and reel combination (10) which includes an elongated arcuate reel positioning member (16). Fly rod (11) is provided with a hollow butt end (13) and a hollow cylindrical extension (19) having a set of male threads (20) on its outside surface. Fly reel (28) is attached to a second end (25) of an elongated arcuate reel positioning member (16) which has a positioner extension member (18) attached to a second end. Positioner extension member (18) is sized and shaped to be frictionally received by cylindrical extension (19). A stop flange (22) is radially attached around the first rod attachment end (17) of the elongated arcuate reel positioning member (16) between it and positioner extension member (18). Flange (22) prevents the rod attachment end of the elongated arcuate reel positioning member (16) from entering into the hollow cylindrical extension (19) when positioner extension member (16) is engaged therein. A coupler nut having a set of female threads (24) is slidably and rotatably engaged on the main elongated portion of the reel positioning member (16) and is further configured to encompass stop flange (22) and engage male threads (20) on the outer surface of the cylindrical extension (19), thereby coupling the elongated arcuate reel positioning member (16) to the fly fishing rod (11).

U.S. Pat. No. 6,155,508 to Lepage discloses a large arbor fly fishing reel with a smooth drag and the ability to change spools without removing any additional parts. The reel is provided with spring loaded locking tabs permanently fixed to a spool base which retain the spool upon the spool base and a drag to which pressure is applied through a central spring.

Fly fishing can become tiring after a while due to the weight of the rod and the reel and the back and forth movement of the rod. There remains a need for a fishing rod that is easy to use and prevents fatigue during use.

Tenkara fishing is a simple Japanese fishing style that is done using a line of a fixed length at the tip of the rod. A drawback of this is that the fisherman is unable to adjust the length of the line. If a line longer than the rod is used, it is very difficult to pull the fish in without walking back on the bank or having someone else net the fish. If fishing alone, the fisherman must raise the rod all the way behind their head while holding the line with their other hand. This can be problematic because the rod, line, and the fish itself are at risk of becoming damaged. There remains a need for a improved method of Tenkara fishing.

SUMMARY OF THE INVENTION

The present invention provides for a fishing rod including a rod body, a free line cast control and drag mechanism operatively connected to a proximal end of the rod body, and a line operatively threaded through the free line cast control and drag mechanism and running through a hollow passageway of the rod body and out a distal end.

The present invention provides for a method of fishing with the fishing rod by casting the line out of the distal end of the rod body onto a body of water, detecting that a fish is on the line, and pulling the line through the proximal end of the rod body and through the free line cast control and drag mechanism.

The present invention provides for a fishing rod including a hollow rod body having a line extending therethrough and a free line cast control and drag mechanism that applies pressure as needed to the line to control movement of the line through the rod body in order to extend the line from the rod body or draw the line back in.

The present invention also provides for a method of retracting a line using a rod by extending the line through an internal passageway of a hollow rod, applying pressure to the line in the passageway to control drag on the line, and manually drawing the line back through the passageway to retract the line.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
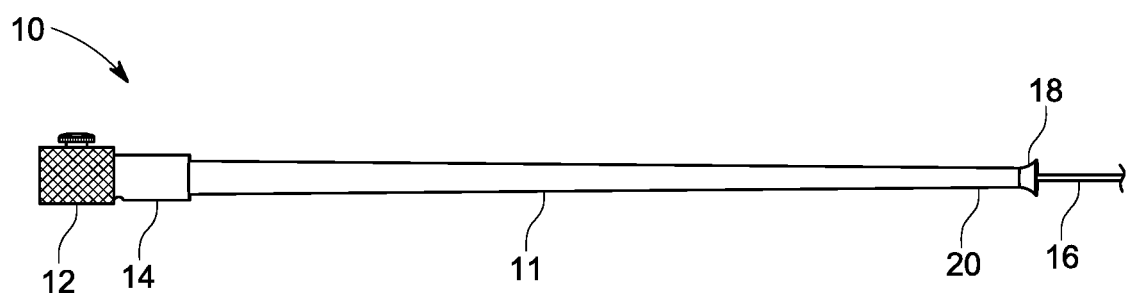
FIG. 1 is a side view of the fishing rod of the present invention.
Figure 5A:
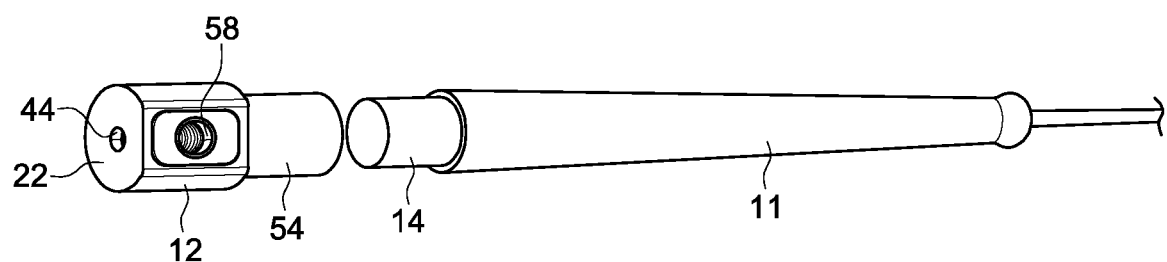
FIG. 5A is a photograph of a top perspective view of a disassembled fishing rod and FIG. 5B is a photograph of a top perspective view of an assembled fishing rod.
Figure 5B:
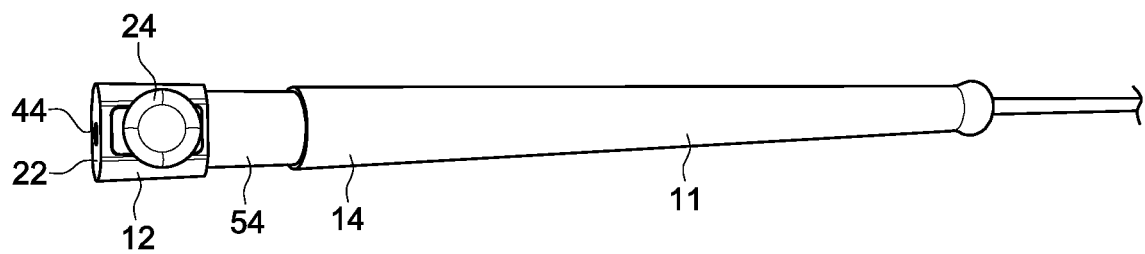

The present invention provides generally for a fishing rod that is easier to use for fishermen to precisely cast short to medium distances than prior art rods, especially during fly fishing. As shown in FIG. 1, the fishing rod 10 includes a rod body 11, a free line cast control and drag mechanism 12 operatively connected to a proximal end 14 of the rod body 11, and a line 16 operatively threaded through the free line cast control and drag mechanism 12 and running through a hollow passageway 18 of the rod body 11 and out a distal end 20. The fishing rod 10 of the present invention allows an individual to cast a weighted fly with only one stroke using a typical fishing line. FIGS. 5A and 5B show disassembled and assembled views of the free line cast control and drag mechanism 12 and rod body 11. Most generally, the present invention provides for a fishing rod 10 including a hollow rod body 11 having a line 16 extending therethrough and a free line cast control and drag mechanism 12 that applies pressure as needed to the line 16 to control movement of the line 16 through the rod body 11 in order to extend the line 16 from the rod body 11 or draw the line 16 back in.

The rod body 11 can be any suitable fishing rod body, and can be made of fiberglass, carbon fiber, or any other suitable material. The rod body 11 can be different lengths for different purposes or sized for different users. The hollow passageway 18 of the rod body 11 can be any suitable diameter to easily allow the line 16 to move freely within.

Figure 2:
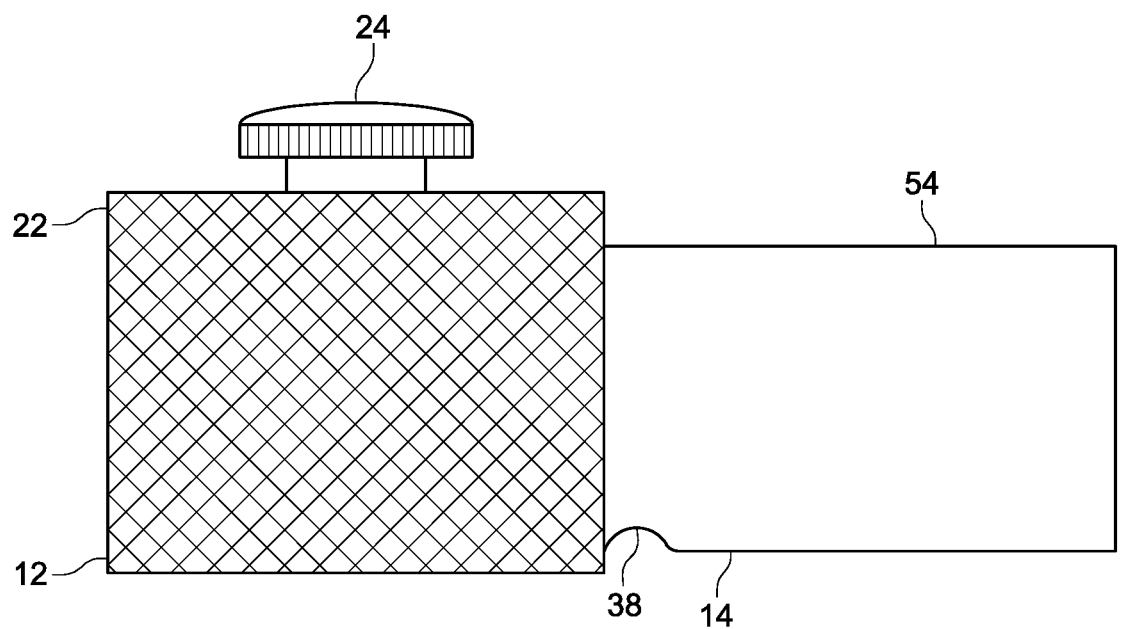
FIG. 2 is a side view of the free line cast control and drag mechanism of the present invention.
Figure 7:
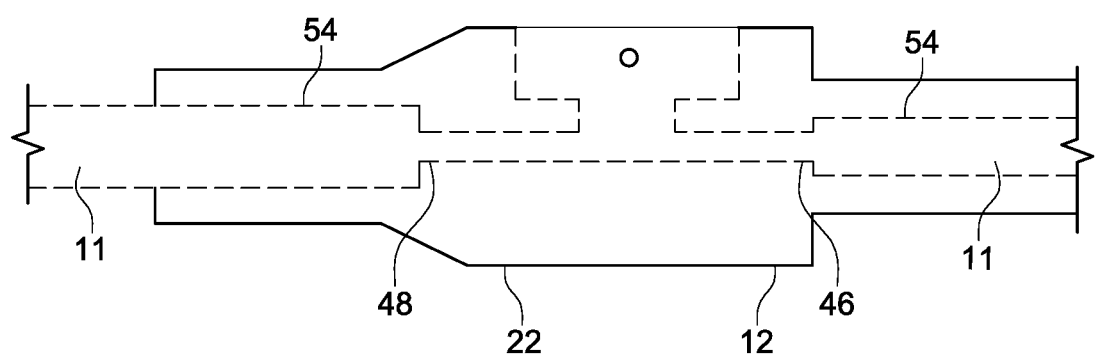
FIG. 7 is an alternative embodiment of a cross-sectional view of a housing of the free line cast control and drag mechanism.

The free line cast control and drag mechanism 12 replaces the reel assembly used in the prior art, thus eliminating much of the weight of the fishing rod 10 and making the fishing rod 10 more comfortable to use. The free line cast control and drag mechanism 12 allows an individual to selectively apply pressure or drag to a line 16 as it is released from the fishing rod 10. The free line cast control and drag mechanism 12 also allows an individual to more precisely control the length of the line 16 by applying pressure to the line when it is at the desired length. The free line cast control and drag mechanism 12 is shown in more detail in FIGS. 2 and 3, and includes a housing 22. The housing 22 can be made of plastic, metal, or any other suitable material. The housing 22 is of a cylindrical shape with a passageway 44 extending therethrough from a proximal end 46 to a distal end 48, and includes a top outlet 58 for receiving a push button 24 and related pieces described below. The passageway 44 is also connected to a rod receiving compartment 54 that receives the proximal end 14 of the rod body 11. The rod receiving compartment 54 can be sized to fit any suitable rod body 11. As shown in FIG. 7, an additional rod receiving compartment 54 can also be configured to sit at the proximal end 46 in addition to the distal end 48 of the housing 22. In this configuration, the fishing rod 10 is operated in the same manner, and only its position can be changed should the individual using it decide that the alternative placement is more comfortable for their operation of the fishing rod 10.

Figure 3:
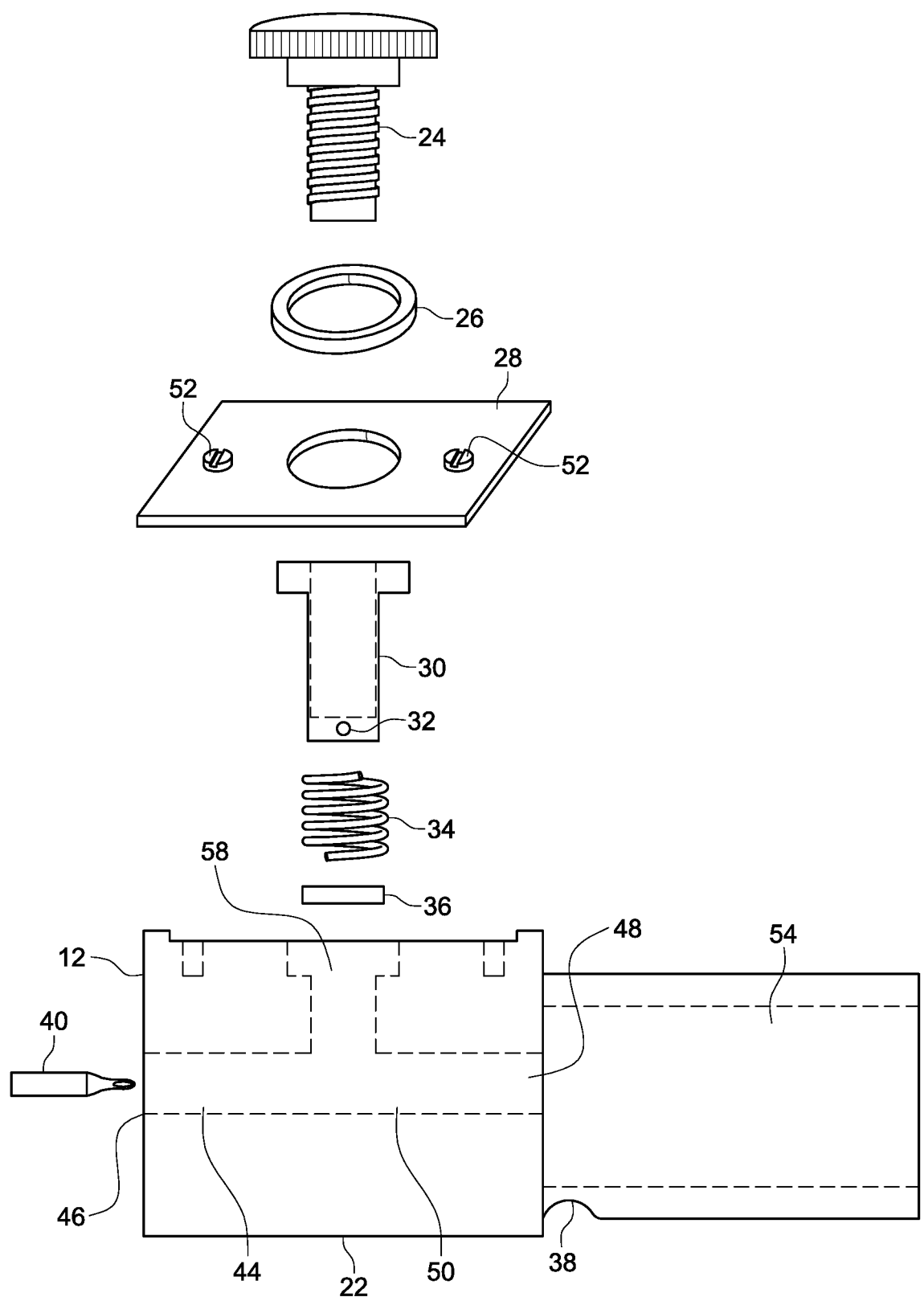
FIG. 3 is an exploded view of the inside of the free line cast control and drag mechanism.

As shown in FIG. 3, the housing 22 includes a push button 24, a lock washer 26, a holding plate 28, a line pressure pin 30, a lock/unlock hole 32, a spring 34, a drag piece 36, a draining hole 38, and a line stopper 40. The line 16 enters the housing 22 through the proximal end 46 of the passageway 44 and continues through the distal end 48 of the passageway 44 and through the hollow passageway 18 of the rod body 11 with no tension. The drag piece 36 is positioned at a bottom side 50 of the passageway 44 below the line 16, and is preferably made of rubber, but can also be any other suitable material that can place drag on the line 16. The drag piece 36 is designed to hold the line 16 loosely enough to prevent the line 16 from breaking. When pressure is applied by the push button 24, the pressure pin 30 pushes the line 16 onto the drag piece 36, ultimately acting as the drag. The spring 34 holds the pressure pin 30 preventing it from pushing onto the line 16 unless pressure is directly applied by pushing on the push button 24. The lock/unlock hole 32 is designed to allow disassembly of the mechanism 12 for cleaning purposes. Any suitable small key device, such as a traditional safety pin, can be inserted into the lock/unlock hole 32 to unlock and allow for disassembly. The holding plate 28 is screwed into the housing 22 by two small screws 52. The purpose of the holding plate 28 is to secure the pressure pin 30, spring 34, and drag piece 36 inside the housing 22 in the assembled condition. The lock washer 26 locks in place the positions of the push button 24 and line pressure pin 30. The draining hole 38 is included so that water does not accumulate in the housing 22 and is designed to drain any water that may have entered the housing 22.

Figure 6:
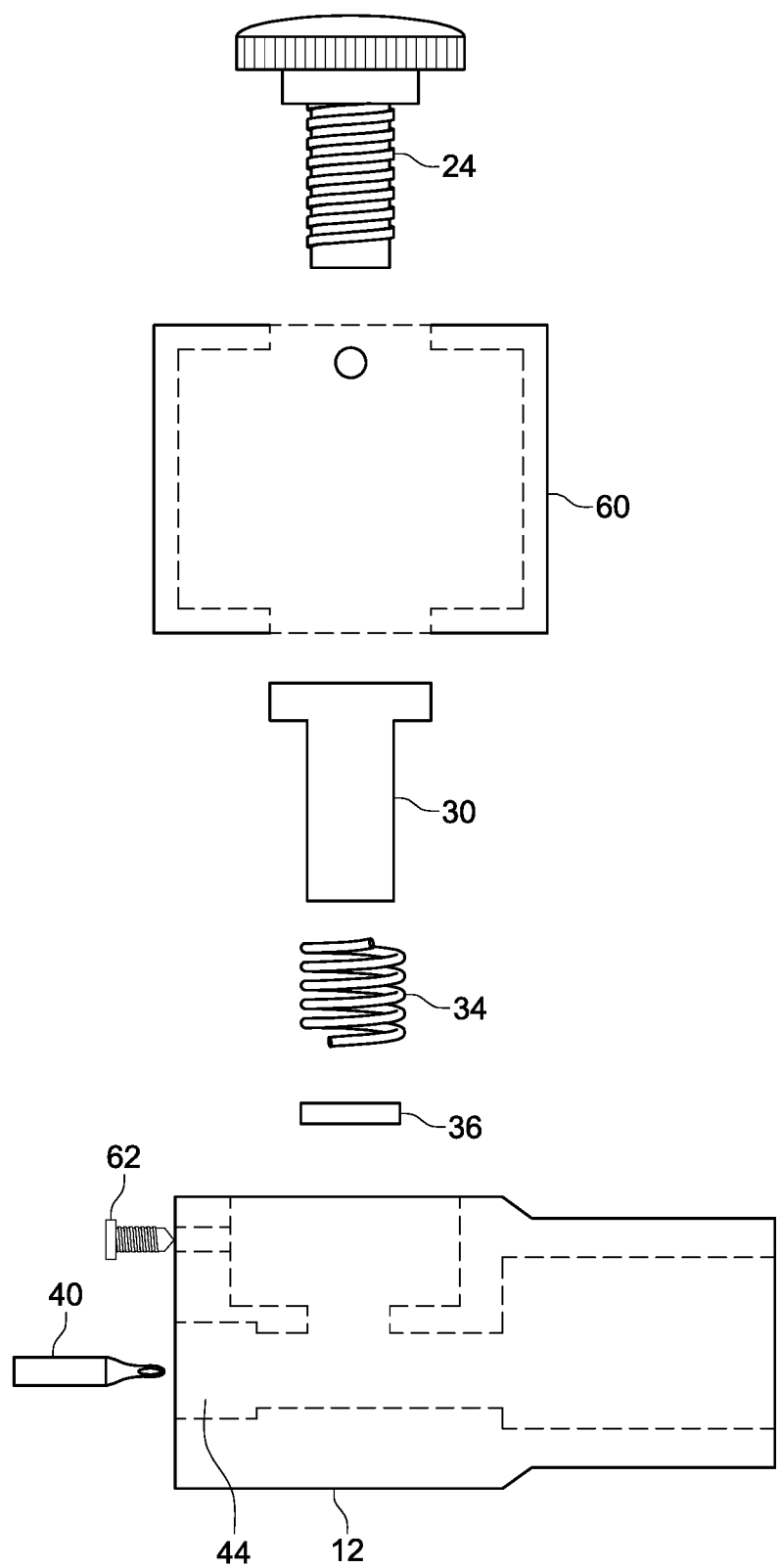
FIG. 6 is an alternative embodiment of an exploded view of the inside of the free line cast control and drag mechanism.

An alternative embodiment of the housing 22, shown in FIG. 6, holding plate 28 can be replaced with an internal housing 60 to secure the pressure pin 30 and spring 34. In this embodiment, there is no washer lock 26, lock/unlock hole 32 on the pin 30, or draining hole 38. The internal housing 60 can be secured in place to the housing 22 with a small screw 62, at any suitable location on the housing 22.

The line 16 can be any suitable fishing line. The line 16 can also include a floating line stopper 40 to ensure that the line 16 is secure, and connected to a proximal end 56 of the line 16 to weigh it down so that the line 16 does not float around under the individual's arm. Since most fly fishing is done in the water, the line stopper 40 has two purposes. First, attached to the proximal end 56 of the line 16, it causes the proximal end 56 to float above the water. Second, when a fish is hooked and begins to pull on the line 16, the line stopper 40 is there to prevent the line 16 from being pulled out through the distal end 20 of the rod 10.

Figure 4:
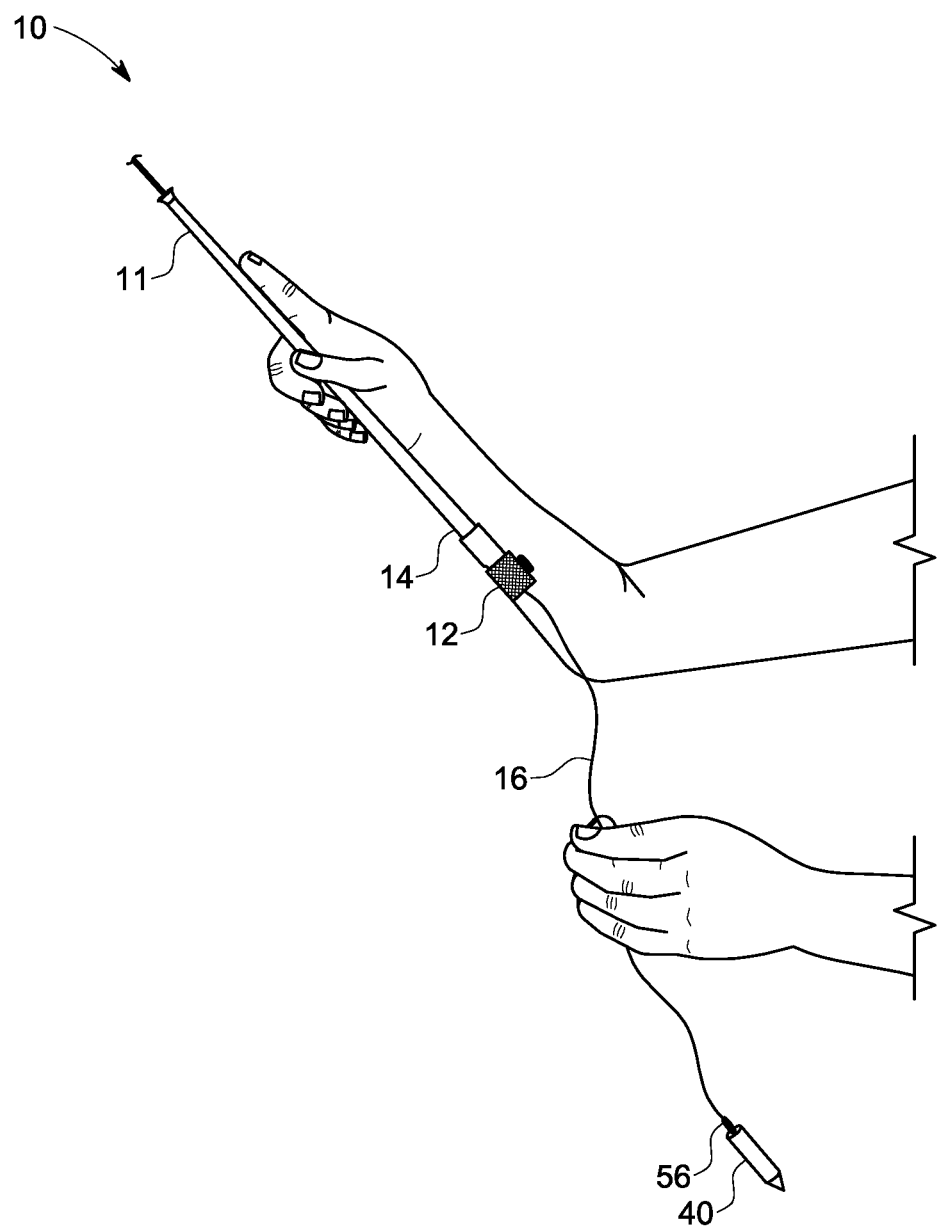
FIG. 4 is a side view of an individual using the fishing rod of the present invention.

The present invention provides for a method of using the fishing rod 10, by casting the line 16 out of the distal end 20 of the rod body 11 onto a body of water, detecting that a fish is on the line 16, and pulling the line 16 through the proximal end 14 of the rod body 11 with the free line cast control and drag mechanism 12. A cast is made allowing the line 16 to be dispensed from the distal end 20 of the fishing rod 10. A variable length of line 16 can be used depending on the casting distance. There is the option to cast the entire length of the line 16 with one stroke. Alternatively, a precision cast can be made by stopping the line 16 by manually holding it in place with one hand (shown in FIG. 4). This allows for an individual to be better able to feel the fish bite. The length of the line 16 can also be fixed by inserting the line stopper 40 into the bottom of the free line cast control and drag mechanism 12. Once the fish bite is felt, the hook can be set and pressure can immediately be put onto the free line cast control and drag mechanism 12. Pressure is applied to the push button 24 (when the fish is hooked or any time the individual wishes to stop the line) and this manually applies pressure or drag to the line 16 by the pressure pin 30 pushing the line 16 onto the drag piece 36. Preferably, the push button 24 is pushed down with the individual's arm while pulling the rod 10 upwards, once the fish is hooked, as shown in FIG. 4. Pressure or drag can be released from the line 16 by releasing the push button 24 which is spring biased to move radially outward. To pull a fish in, the individual can alternate manually pulling the line 16 through the free line cast control and drag mechanism 12 and applying pressure onto the free line cast control and drag mechanism 12. Any water that has accumulated in the housing 22 can be drained through the draining hole 38.

The fishing rod 10 can also be used for Tenkara fishing, and provides advantages over the traditional method because the length of the line 16 can be adjusted, and when using a longer line 16, a fisherman is able to pull in and net a fish without assistance.

The present invention also provides generally for a method of retracting a line 16 using a rod 10 by extending the line 16 through an internal passageway 18 of a hollow rod 10, applying pressure to the line 16 in the passageway 18 to control drag on the line 16, and manually drawing the line 16 back through the passageway 18 to retract the line 16. The line 16 is extended as described above using the free line cast control and drag mechanism 12 to a desired length and pressure to the line 16 is applied by pressing on the drag piece 36 through pressure pin 30. When a fish has been caught or a new cast is desired, the line 16 can be manually drawn back and retracted through the passageway 18.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A fishing rod comprising:
   a rod body;
   a free line cast control and drag mechanism operatively connected to a proximal end of said rod body; and
   a line operatively threaded through said free line cast control and drag mechanism and running through a hollow passageway of said rod body and out a distal end such that said line is capable of being manually pulled through said proximal end of said rod body with a hand of a user with direct contact between said user and said line, wherein said free line cast control and drag mechanism allows said user to manually apply and release pressure to said line by an arm of said user applying or releasing pressure on said free line cast control and drag mechanism by said arm of said user being in direct contact with said free line cast control and drag mechanism, said free line cast control and drag mechanism including a housing including a passageway extending from a proximal end to a distal end and a top outlet, a drag piece and a spring that prevents said drag piece from pushing into said line unless pressure is directly applied by said arm of said user onto a push button that pushes said line onto said drag piece, wherein said push button activates a pressure pin that contacts and pushes said line onto said drag piece, and said spring holding said pressure pin that prevents said pressure pin from contacting and pushing into said line until pressure is applied to said push button, wherein a longitudinal axis of said free line cast and control drag mechanism is aligned with a longitudinal axis of said rod body, and wherein said fishing rod is configured for fly fishing and does not include a reel.

2. The fishing rod of claim 1, wherein said rod body is made of a material chosen from the group consisting of fiberglass and carbon fiber.

3. The fishing rod of claim 1, wherein said housing is made of a material chosen from the group consisting of plastic and metal.

4. The fishing rod of claim 1, wherein said housing is a cylindrical shape.

5. The fishing rod of claim 1, wherein said passageway is connected to at least one rod receiving compartment for receiving a proximal end of said rod body.

6. The fishing rod of claim 1, wherein said housing further includes a lock/unlock hole for disassembly of said free line cast control and drag mechanism.

7. The fishing rod of claim 1, wherein a holding plate secures said pressure pin, said spring, and said drag piece inside said housing.

8. The fishing rod of claim 1, further including a lock washer surrounding said push button for locking said push button and said pressure pin in place.

9. The fishing rod of claim 1, further including a draining hole.

10. The fishing rod of claim 1, further including an internal housing that secures said pressure pin and said spring.

11. The fishing rod of claim 1, wherein said line further includes a floating line stopper at a proximal end that prevents said line from being pulled out through said distal end of said rod body.

12. A fishing rod comprising a hollow rod body including a line extending therethrough and a free line cast control and drag mechanism that applies and releases pressure manually by an arm of a user as needed to said line to control movement of said line through said rod body by said arm of said user being in direct contact with said free line cast control and drag mechanism in order to extend said line from said rod body or draw said line back in wherein said line is capable of being manually pulled through a proximal end of said rod body with a hand of said user by direct contact between said user and said line, said free line cast control and drag mechanism including a drag piece and a spring that prevents said drag piece from pushing into said line unless pressure is directly applied by said arm of said user onto a push button that pushes said line onto said drag piece, wherein said push button activates a pressure pin that contacts and pushes said line onto said drag piece, and said spring holding said pressure pin that prevents said pressure pin from contacting and pushing into said line until pressure is applied to said push button, wherein a longitudinal axis of said free line cast and control drag mechanism is aligned with a longitudinal axis of said rod body, and wherein said fishing rod is configured for fly fishing and does not include a reel.

13. A free line cast control and drag mechanism for use with a fishing rod having a rod body, comprising:
   a housing including a passageway extending from a proximal end to a distal end for receiving a fishing rod and line and a top outlet for receiving a push button mechanism for applying drag to said line within said passageway, wherein said free line cast control and drag mechanism allows a user to manually apply and release pressure to said line with an arm of said user by said arm of said user being in direct contact with said free line cast control and drag mechanism, wherein said line is capable of being manually pulled through said housing at a proximal end of said fishing rod with a hand of said user by direct contact between said user and said line, said free line cast control and drag mechanism including a drag piece and a spring that prevents said drag piece from pushing into said line unless pressure is directly applied by said arm of said user onto a push button that pushes said line onto said drag piece, said push button activating a pressure pin that contacts and pushes said line onto said drag piece, and said spring holding said pressure pin that prevents said pressure pin from contacting and pushing into said line until pressure is applied to said push button, said housing further including a lock/unlock hole for disassembly of said free line cast control and drag mechanism, a lock washer surrounding said push button for locking said push button and said pressure pin in place, a draining hole, and an internal housing that secures said pressure pin and said spring, and wherein a holding plate secures said pressure pin, said spring, and said drag piece inside said housing, wherein a longitudinal axis of said free line cast and control drag mechanism is aligned with a longitudinal axis of said rod body, and wherein said free line cast control and drag mechanism is configured for fly fishing and does not include a reel.

* * * * *